United States Patent
Verne et al.

(10) Patent No.: US 9,405,602 B1
(45) Date of Patent: Aug. 2, 2016

(54) METHOD FOR APPLICATION NOTIFICATION AND TASKING

(75) Inventors: Nicholas Verne, Balmain (AU); Vivek Sahasranaman, Bangalore (IN); Vibhooti Verma, Bangalore (IN); Louis Ryan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/532,496

(22) Filed: Jun. 25, 2012

(51) Int. Cl.
*G06F 9/54* (2006.01)
*G06F 9/48* (2006.01)

(52) U.S. Cl.
CPC .............. *G06F 9/545* (2013.01); *G06F 9/547* (2013.01); *G06F 9/4881* (2013.01)

(58) Field of Classification Search
CPC ....... G06F 9/4881; G06F 9/546; G06F 9/541; G06F 9/547
See application file for complete search history.

(56) References Cited

U.S. PATENT DOCUMENTS

| | | | |
|---|---|---|---|
| 6,330,582 B1 | 12/2001 | Kuo et al. | |
| 7,266,821 B2 | 9/2007 | Polizzi et al. | |
| 7,814,492 B1* | 10/2010 | Creemer et al. | 718/104 |
| 8,032,890 B2 | 10/2011 | Brendle et al. | |
| 8,307,362 B1* | 11/2012 | Gong et al. | 718/104 |
| 2009/0276791 A1* | 11/2009 | Meijer | 719/318 |
| 2010/0023949 A1* | 1/2010 | Jackson | 718/104 |
| 2010/0251263 A1* | 9/2010 | Coelho et al. | 719/314 |
| 2010/0257229 A1* | 10/2010 | Bolohan et al. | 709/203 |
| 2011/0302569 A1 | 12/2011 | Kunze et al. | |
| 2012/0222042 A1* | 8/2012 | Chess et al. | 718/105 |
| 2013/0179895 A1* | 7/2013 | Calder et al. | 718/104 |

* cited by examiner

*Primary Examiner* — Lewis A Bullock, Jr.
*Assistant Examiner* — Jacob Dascomb
(74) *Attorney, Agent, or Firm* — Lerner, David, Littenberg, Krumholz & Mentlik, LLP (57) ABSTRACT

A method for notifying and tasking computer applications hosted by an application execution system by computer applications external to the application execution system is provided. An external computer application may use an external Task queue API to add tasks to the internal application's task queue. The internal application can then see the tasks and act upon the tasks at a convenient, non-busy time for the internal application. An intermediary subscription system may manage an internal application's event subscriptions. When an event occurs, the intermediary subscription system may add a task to the subscribing internal application's task queue. A second intermediate system manages the access control list of an internal application's task queue. This system restricts access to the task queue to only those external applications that are explicitly granted permission in the internal application's task queue configuration file.

14 Claims, 7 Drawing Sheets

FIG. 1

```
queue:
- name: pull-queue
  mode: pull
  acl:
  - user_email: bar@foo.com      #can list, get, lease, and delete tasks
  - writer_email: user@gmail.com #can insert and update tasks
  - writer_email: bar@foo.com    #can do all
```

METHOD FOR APPLICATION NOTIFICATION AND TASKING

BACKGROUND

A distributed application execution system may be used to develop and host large numbers of computer applications, with each application having its own set of fluctuating resource requirements. Such a system may contain an application master and a plurality of application servers. Computer applications running in the application execution system may be sandboxed and executed across multiple application servers in several data centers.

Figure 1:
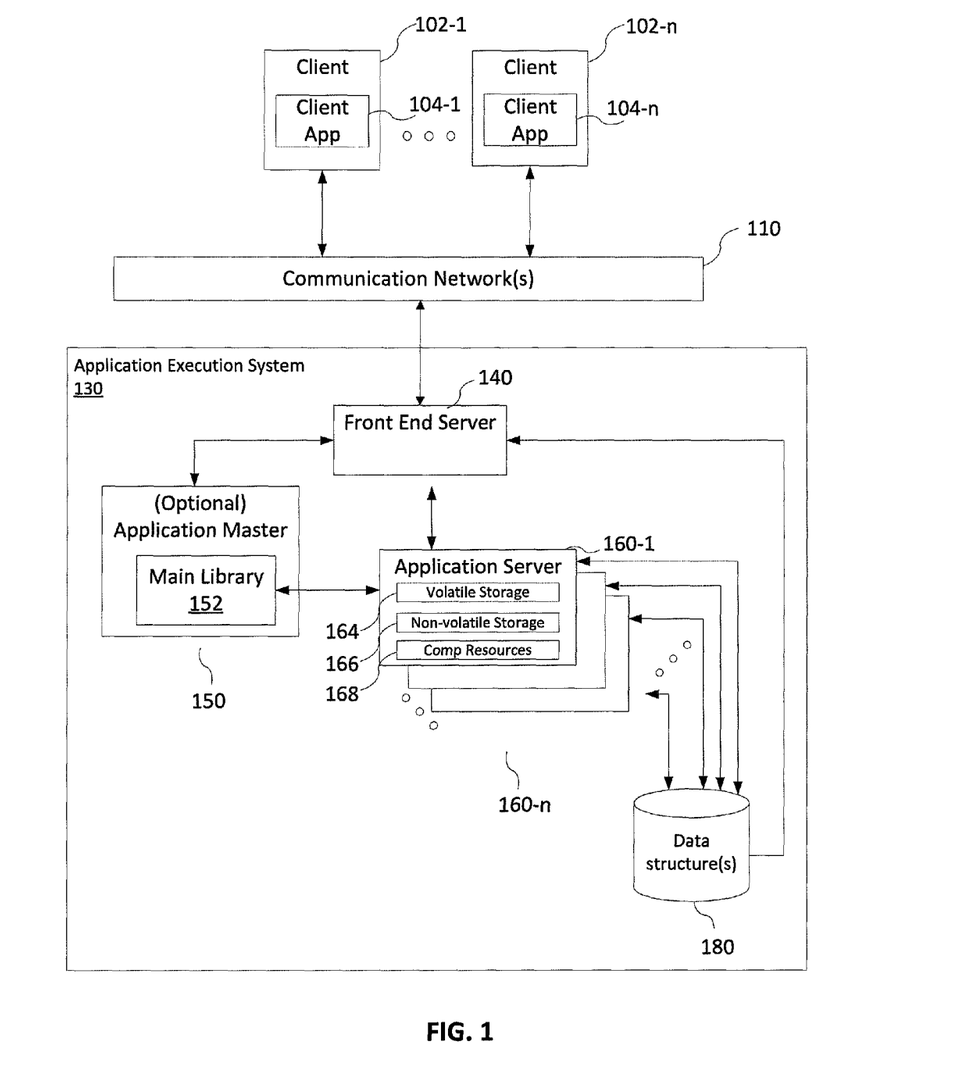
FIG. 1 is a block diagram illustrating an exemplary application execution system.

FIG. 1 is a block diagram of a distributed computing system 100 including an application execution system 130 connected to a plurality of clients 102 (e.g. 102-1 . . . 102-n) through a network 110 such as the Internet, other wide area networks, local area networks, metropolitan area networks, wireless networks, or any combination of such networks. In some embodiments, a respective client 102 contains one or more client applications 104 (e.g. 104-1 . . . 104-n), such as a web browser, for submitting application execution requests to the application execution system 130. The client 102 (sometimes called the "client device" or "client computer") may be any computer or similar device through which a user of the client 102 can submit requests to and receive results or services from the application execution system 130. Examples of a client device 102 include, without limitation, desktop computers, notebook computers, tablet computers, mobile devices such as mobile phones, personal digital assistants, set-top boxes, or any combination of the above.

In some embodiments, the application execution system 130 includes one or more front-end servers 140. The front-end sever 140 receives application execution requests from clients 102 and returns results to the requesting clients.

The application execution system 130 also includes a plurality of application servers 160 (e.g., 160-1 through 160-n). Each of the application servers 160 includes volatile storage 164 for executing one or more applications, non-volatile storage 166 for storing one or more applications, and computational resources 168 for executing applications in response to requests received by the application execution system 130.

In some embodiments, the application execution system 130 also includes an application master 150 that distributes applications, from a main library 152 having a plurality of applications, among the application servers 160. In the embodiment shown in FIG. 1, the main library 152 is stored in the application master 150. In some embodiments, each application of the plurality of applications in the main library 152 is a web application that is responsive to HTTP requests. However, the present invention can also be used in non-web based environments, in which case the applications need not be web-based applications.

In other embodiments, the application execution system 130 includes a data store 180 that is accessible to each of the application servers 160, which includes information about which application servers accept service requests for a particular application.

A distributed application execution system may be used for developing and hosting computer applications in data centers across the world. The application execution system may automatically scale a computer application as the number of requests increases for the application. Scaling may include allocating more resources for a computer application when the application experiences an increase in requests.

Furthermore, the system may provide access to application programming interfaces (APIs) that are only available to the computer applications that exist within the application execution system. An API is a code-based specification that allows software components to communicate with one another. APIs may contain information such as the methods available and the data returned by the available methods from a particular web service.

A customary distributed application execution system may provide computer applications with an API for queuing tasks. A task may be defined as a small amount of work and may consist of two parts: (1) a data payload which parameterizes the task and (2) the code which implements the task. Tasks may be added to a queue in order for the tasks to be processed in the background of a computer application. Using a task queue, computer applications can define tasks, add them to a queue, and process the tasks in aggregate and in non-real-time. In a customary distributed application execution system, a task queue may be one of several types including a push queue or a pull queue.

A push queue pushes work to workers in a computer application when tasks are available for that application. The work is processed by the distributed application execution system's infrastructure which automatically scales the computer application which has tasks to do.

In contrast, pull queues allow a task consumer to lease tasks at a specific time for processing within a specific time period. The task is locked to the task consumer for the time period of the lease. The task consumer tries to process and delete tasks before the lease ends. If the task consumer does not complete the task in the allotted time period, the task is made available for other task consumers to lease. The task can be leased a configurable amount of times before the task is deleted from the queue without being processed.

Computer applications within an application execution system are considered internal applications whereas computer applications that are not in the application execution system are considered external computer applications. In some instances, internal computer applications may need to perform work received from external computer applications. To perform the work, an internal computer application needs to be notified about the work and assigned tasks to complete the work.

Conventional processes notify internal computer applications in real-time about tasks which causes the internal computer applications to act on the tasks as they are received. This immediate reaction to tasks can interfere with the internal computer application's behavior because resources may have to be dedicated to responding to the tasks. To avoid interference with an internal computer application's real-time behavior, there should be an external notification and tasking process that allows an internal computer application to receive external tasks in non-real-time. As recognized by the inventors, tasks from external systems should be sent to an internal computer application using a mechanism that allows the internal application to act upon the tasks at a convenient, non-busy time for the application.

SUMMARY

This specification describes technologies relating to application execution systems, application notification and tasking, and specifically to methods and systems for applications outside of an application execution system to assign tasks to applications within the application execution system in non-real-time.

In general, one aspect of the subject matter described in this specification can be embodied in a system and a method for enabling application tasking in an application execution system from an application external to the application execution system. An exemplary system includes one or more processing devices and one or more storage devices storing instructions that, when executed by the one or more processing devices, cause the one or more processing devices to receive a task from an external application destined for a task queue of an internal application which is inside the application execution system; verify permission of the external application to the task queue; responsive to verification, append the task to the task queue; and assign the task to a worker process in the internal application such that the worker process leases the task from the task queue, processes the task, and responsive to completing the task, removes the task from the task queue. An exemplary method includes receiving a task from an external application destined for a task queue of an internal application which is inside the application execution system; verifying that the external application has permission to access the internal task queue; responsive to verification, appending the received task to the internal task queue; and assigning the appended, received task to a worker process in the internal application.

These and other embodiments can optionally include one or more of the following features: the intermediary subscription process may identify the internal application that subscribed to the event and notify the task queue of the internal application subscribed to the external application's event; verifying the task to be appended to the task queue may include an intermediate process for managing an access control list and checking permissions; the intermediate authorization process may verify that the external application is authorized to access the internal application's task queue using the access control list and responsive to an indication that the external application is permitted to access the internal application's queue, may add a task to the task queue; tasks may be appended via a method in an external REST Task Queue API; and the external REST Task Queue API may include methods for retrieving a task queue, retrieving a list of tasks, retrieving a specific task, inserting a task into the task queue, deleting a task from the task queue, updating a task in the task queue, and leasing a task from the task queue.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

In an exemplary embodiment, computer applications external to an application execution system can conveniently notify and task applications within the application execution system with work through an external REST API for task queues which may be included in the client (102) of FIG. 1. Using this external REST API, external applications may be able to add tasks to an internal application's push or pull task queues. Each internal application may have one or more task queues to which an external application may append tasks. The internal application may then be able to see the added tasks and may process the tasks when the internal application is not busy and processing the tasks will not interfere with the internal application's real-time requests. Tasks may be processed in an order determined by the internal application. Tasks may be leased. However, if a leased task should not be processed at the current time, the task lease can be modified to zero seconds. By modifying the task lease to zero seconds, the task becomes available for another worker to process.

In order for an internal application to be able to accept tasks to its push or pull task queue, the internal application's queue configuration file should specify which external applications are allowed to write to its push or pull queue. Standards for authorization, such as oAuth, are used to authorize computer applications accessing a task queue.

Figure 2:
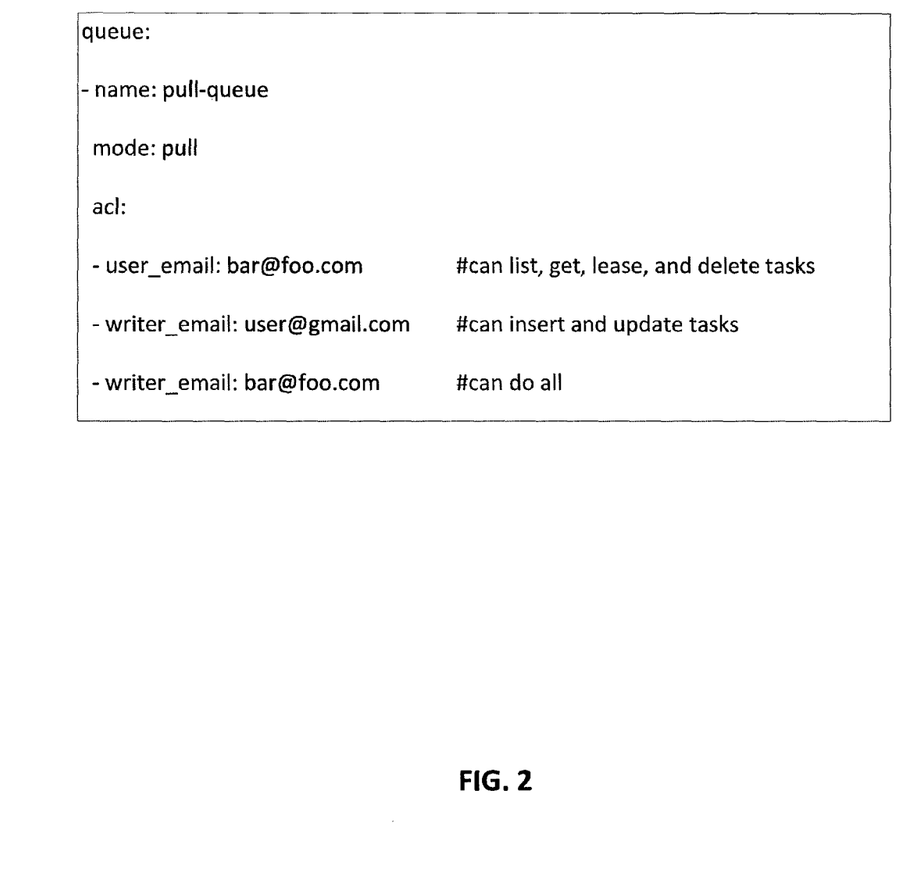
FIG. 2 is a block diagram illustrating an exemplary task queue configuration file.

As discussed above, computer applications within an application execution system are considered internal applications whereas computer applications that are not in the application execution system are considered external computer applications. An internal application developer should create an access control list (ACL) as shown in FIG. 2 which allows the developer to restrict access to the internal application's task queue to only specific email addresses with certain privileges. An ACL may be composed of identifiers and corresponding privileges for those identifiers.

Identifiers may represent users or user applications that can have access to the internal computer application's task queue. For example, as depicted in FIG. 2, two external users represented by the email addresses bar@foo.com and user@gmail.com may have access to the internal task queue, "pull-queue." Each identifier is associated with at least one privilege in the ACL illustrated in FIG. 2. As shown, bar@foo.com has two ACL entries, one for the privilege, user_email, and one for the privilege, writer_email. User_email may be a privilege which enables users or user applications to list, get, lease, update and delete tasks. Writer_email may be a privilege which enables users or user applications to insert tasks. In FIG. 2, user@gmail.com may only have the privilege, writer_email, meaning that user@gmail.com may only insert and update tasks in the "pull-queue" task queue. User@gmail.com cannot view the list of tasks, get the tasks, lease any tasks, or delete tasks because user@gmail.com does not have permission to perform these operations.

In some embodiments, an external task queue REST API allows external applications to add tasks to an internal application's push or pull task queue. As discussed, external applications' identifiers should be added to the ACL list of an internal application's queue configuration file for the external applications to be able to access the internal application's task queue.

The external REST API may include REST methods such as: get task queue; list tasks; get tasks; delete tasks; lease tasks; insert tasks; and update tasks.

"Get TaskQueue" returns information about a specified task queue resource. A task queue resource is a resource type that specifies certain properties of a task queue. A task queue may include properties such as: kind, id, maxLeases, stats, stats.totalTasks, stats.oldestTask, stats.leasedLastMinute, and stats.leasedLastHour. "Kind" identifies the resource type. The "id" property holds the name of the task queue. This name must be unique among all queue names within the internal application. "MaxLeases" is the number of times a client can lease a specific task before the task will be automatically dropped from the queue. If "MaxLeases" is not specified, all tasks will be available for an indefinite number of retries. "Stats" is an object that holds statistics for the queue. "Stats.totalTasks" represents the total number of tasks in the queue. "Stats.oldestTask" provide the timestamp of the oldest task in the queue. "Stats.leasedLastMinute" specifies the number of tasks that were leased in the last minute and "stats.leasedLastHour" identifies the number of tasks leased in the last hour.

"List tasks" lists all non-deleted Tasks in a task queue, whether or not the tasks are currently leased. Tasks may be returned in the same order in which they are stored on the queue.

"Get Task" returns the named task that was requested. The task is not leased, but merely retrieved for viewing.

"Delete Task" deletes a task from a task queue. This method should only be called by a user or user application that owns the lease for a task and has completed the task.

"Lease task" acquires a lease on the topmost N unowned tasks in the task queue.

A user or user application with the privilege to insert may add a task into the task queue using the insert method. If an insert operation is commenced by an application that does not have permission to insert into a task queue, the insert operation may fail. Failure to insert may cause a permission denied error. Tasks may also be updated by the "update task" method by applications with the privilege to update tasks in a particular task queue.

Figure 3:
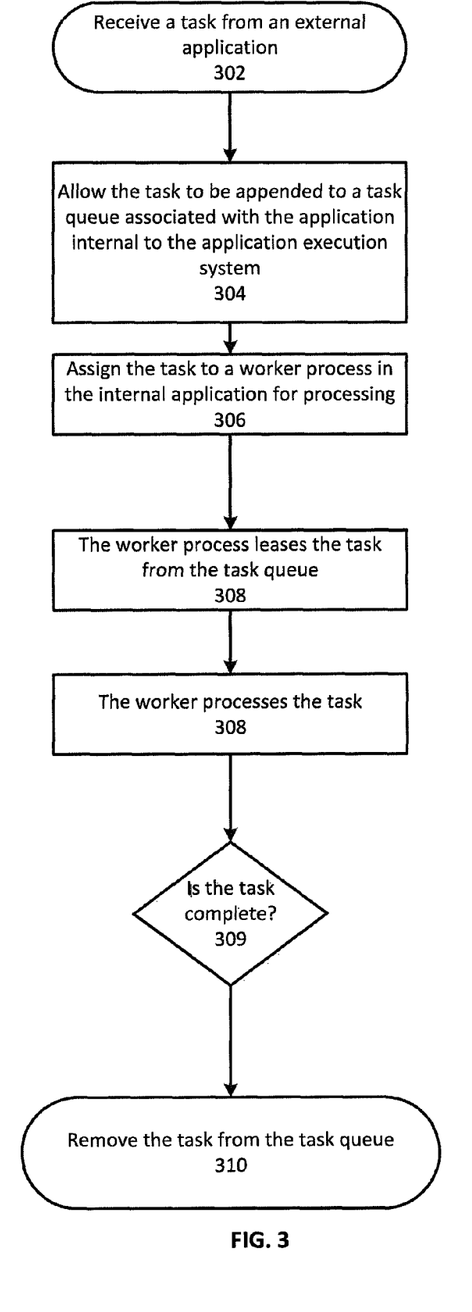
FIG. 3 is a flow diagram of an exemplary method for notifying and tasking a computer application within an application execution system from a computer application outside the application execution system.

As illustrated in FIG. 3, an exemplary process begins with receiving a task from an external application (302). If the external application is in the ACL list of an internal application's queue configuration file and the application has the appropriate privilege, the task will be appended to the task queue associated with the internal application for which it was generated (304). After the task has been appended to the internal application's task queue, the internal application may assign the task to a worker process (306). The worker process may lease the task from the task queue (308). If and when the worker process finishes processing the task, the worker process may remove the task from the queue (310).

Figure 4A:
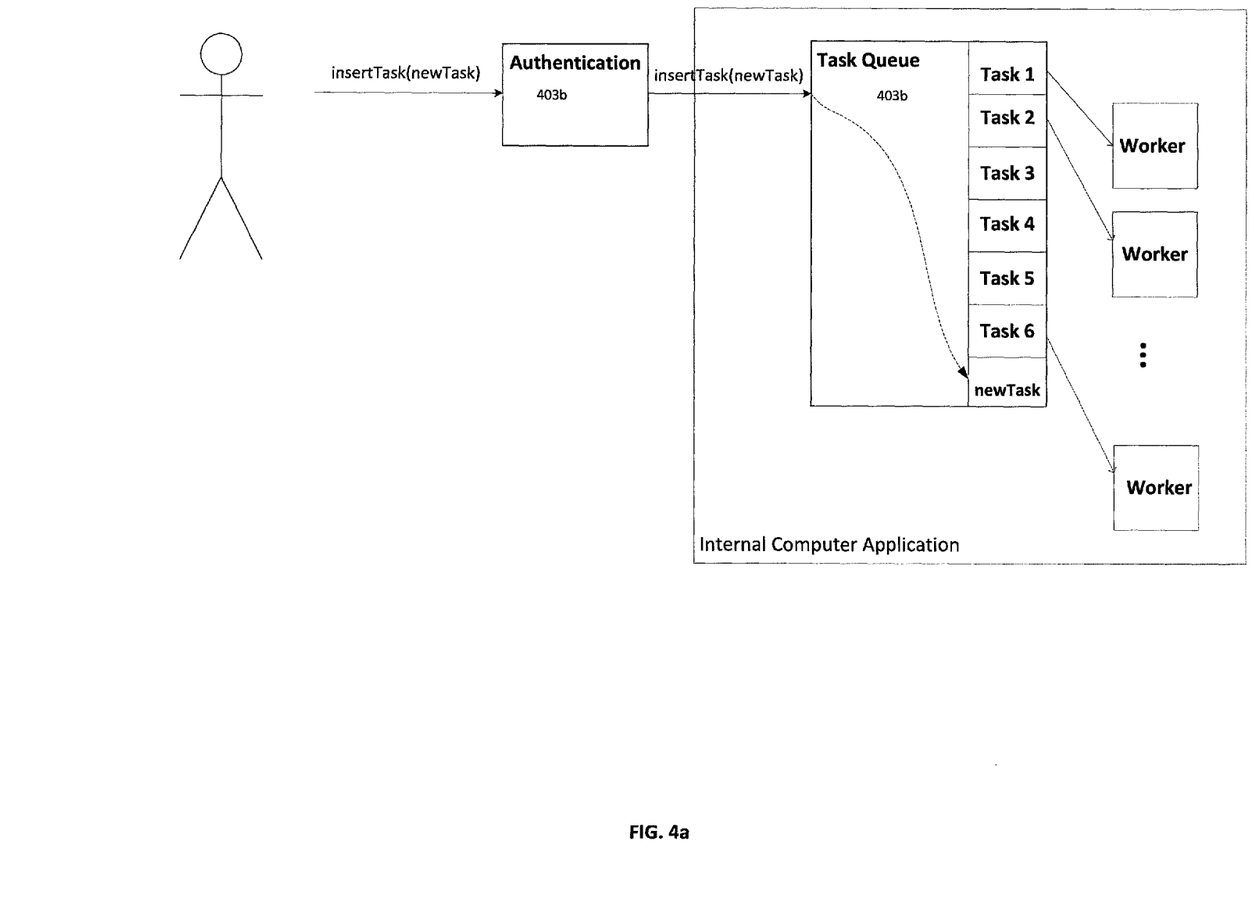
FIG. 4a is a UML diagram illustrating an exemplary process for inserting a task into a task queue.

FIG. 4a depicts an example task insertion by an external user or user application to an internal application's task queue. The external user or user application is authenticated by the ACL and, given the right permissions, may insert a task into the internal application's queue.

In some embodiments, an internal computer application may subscribe to an event or events of an external computer application. When an event occurs to which the internal application is subscribed, the event triggers a task to be added to the internal application's task queue. An intermediary system between external applications and the internal application may manage all of the internal application's subscriptions. Subscriptions are created and deleted in response to API calls. These subscriptions are stored in a database and checked when an event occurs in an application to which other applications are subscribed. When an event occurs in an external system, the intermediary subscription system checks the subscriptions and finds the internal applications that are subscribed to the event. Then, the intermediary system notifies the task queues of the applications subscribed to the event.

Figure 4B:
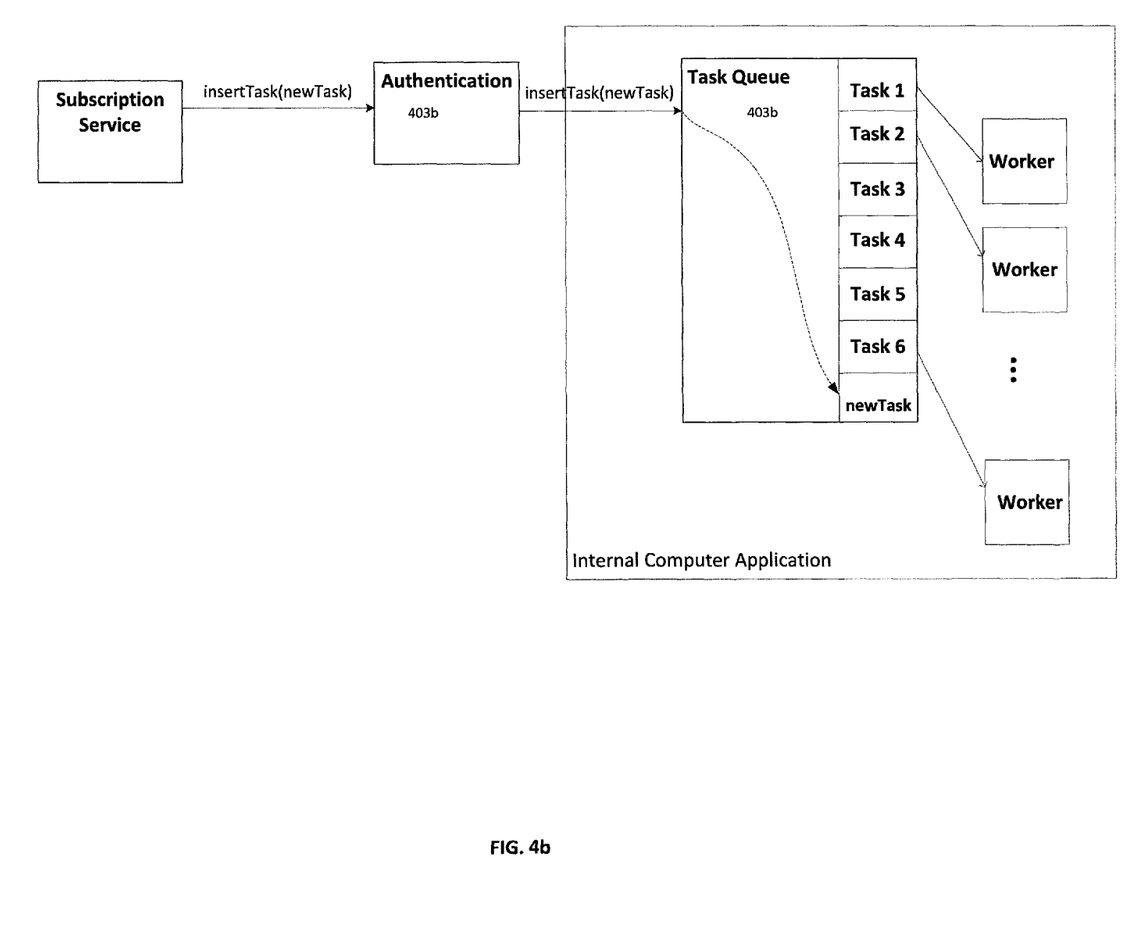
FIG. 4b is a UML diagram illustrating an exemplary process for inserting a task into a task queue.

FIG. 4b depicts an example task insertion process started by an intermediary subscription system. An internal application may subscribe to the events of an external application. When an event occurs to which the internal application is subscribed, the intermediary system notifies the task queue of the internal application. A task is then generated and added to the internal application's task queue.

For example, there may be an external calendaring application which needs to notify an invitee via email that an event has been updated. The email notification functionality may be done by an internal computer application. An email notification task may be inserted into the internal computer application's task queue when the event is updated. The email notification task may be defined as follows:

Task—Email Notification data: the email address and name of the invitee, along with a description of the event code: function which substitutes the relevant strings into an email template and then sends the mail.

When the task is executed, an email will be sent to the invitee notifying the person of the updates to the event.

Figure 5:
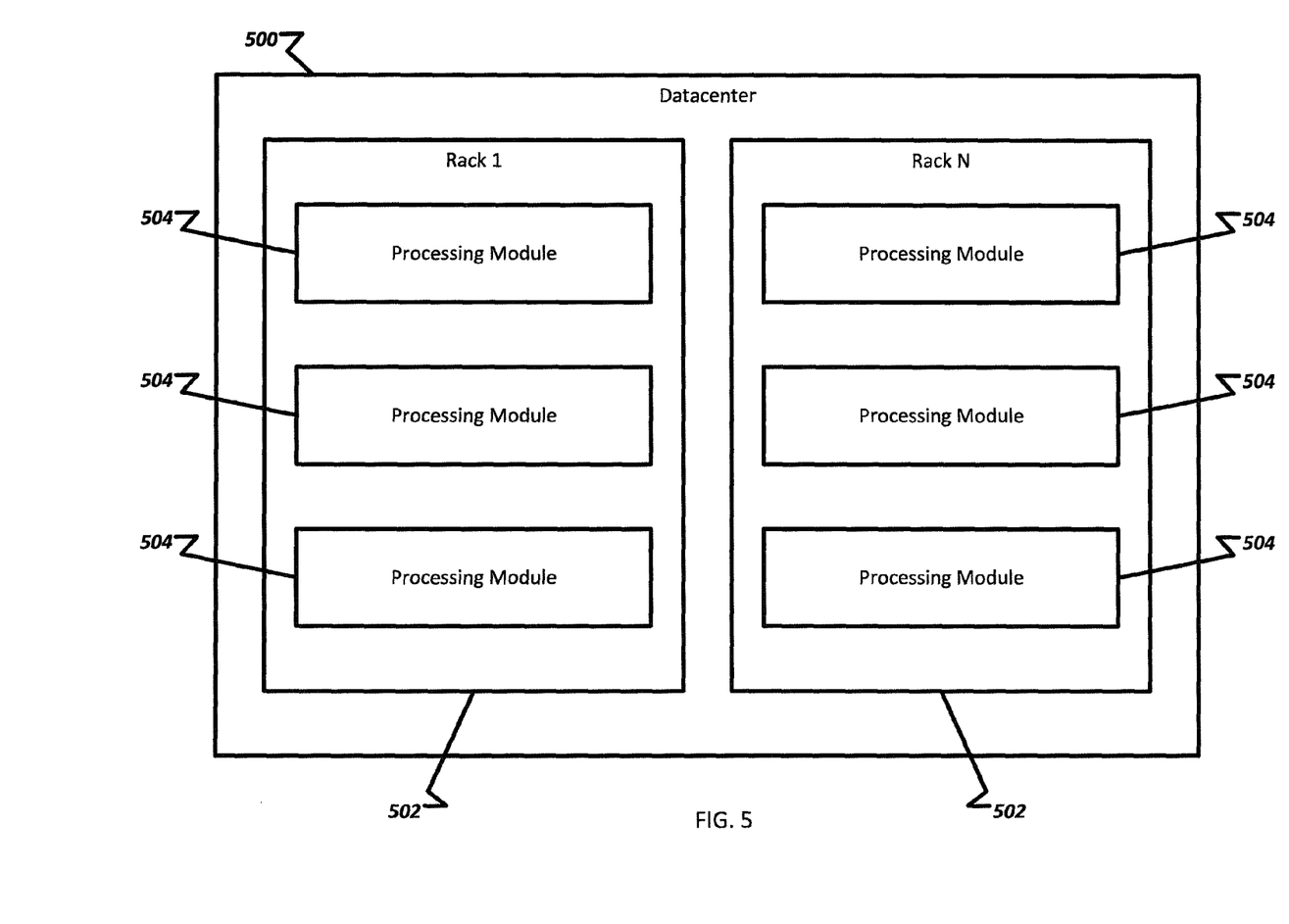
FIG. 5 is a block diagram illustrating an example of a data center.

FIG. 5 is a block diagram illustrating an example of a datacenter (500). The data center (500) is used to store data, perform computational tasks, and transmit data to other systems outside of the datacenter using, for example, a network connected to the datacenter. In particular, the datacenter (500) may perform large-scale data processing on massive amounts of data.

The datacenter (500) includes multiple racks (502). While only two racks are shown, the datacenter (500) may have many more racks. Each rack (502) can include a frame or cabinet into which components, such as processing modules (504), are mounted. In general, each processing module (504) can include a circuit board, such as a motherboard, on which a variety of computer-related components are mounted to perform data processing. The processing modules (504) within each rack (502) are interconnected to one another through, for example, a rack switch, and the racks (502) within each datacenter (500) are also interconnected through, for example, a datacenter switch.

In some implementations, the processing modules (504) may each take on a role as a parent or a child process. The parent processes control scheduling and data distribution tasks among themselves and the children. A rack can include storage, like one or more network attached disks, that is shared by the one or more processing modules (504), and/or each processing module (504) may include its own storage. Additionally, or alternatively, there may be remote storage connected to the racks through a network.

The datacenter (500) may include dedicated optical links or other dedicated communication channels, as well as supporting hardware, such as modems, bridges, routers, switches, wireless antennas, and towers. The datacenter (500) may include one or more wide area networks (WANs) as well as multiple local area networks (LANs).

Figure 6:
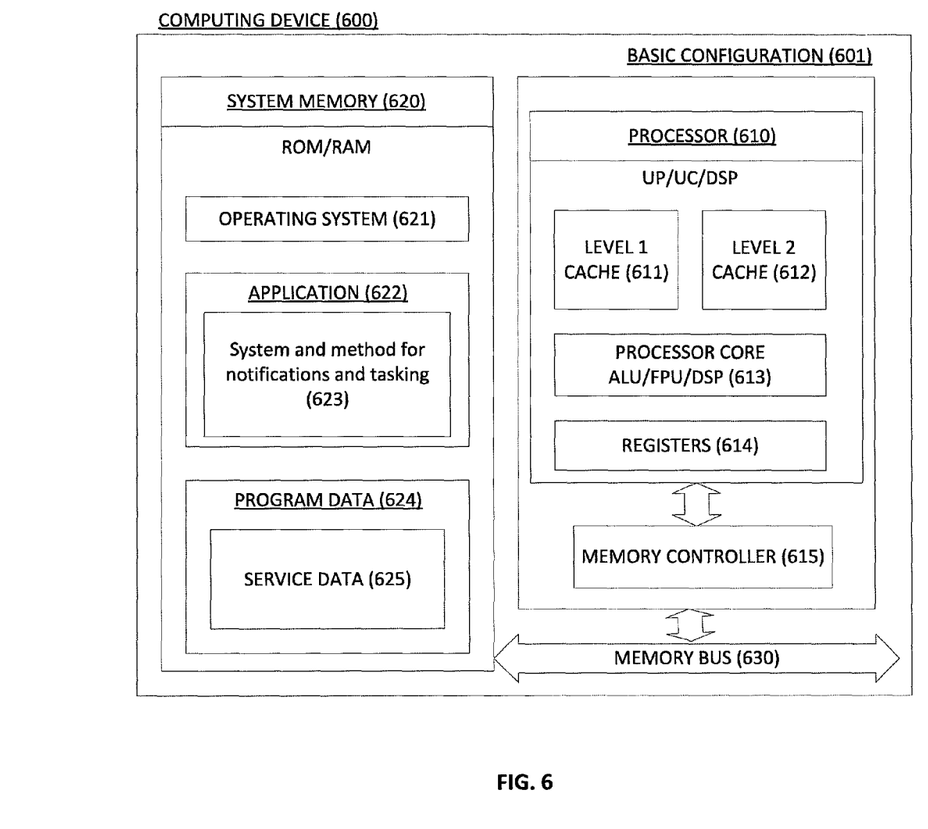
FIG. 6 is a block diagram illustrating an exemplary computing device.

FIG. 6 is a block diagram illustrating an example computing device (600) that is arranged for application notification and tasking and may be used for one or more of the processing modules (504). In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (μP), a microcontroller (μC), a digital signal processor (DSP), or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or any combination thereof. A memory controller (616) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include steps application notification and tasking. Program Data (624) includes storing instructions that, when executed by the one or more processing devices, implement a system and method for allowing applications external to an application execution system to notify and task an internal application. (623). In some embodiments, the application (622) can be arranged to operate with program data (624) on an operating system (621).

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device (600) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for enabling application tasking in an application execution system from an external web application which is external to the application execution system, the system comprising:
   one or more processing devices; and
   one or more storage devices storing instructions that, when executed by the one or more processing devices, cause the one or more processing devices to:
   receive, a task from the external web application destined for a specific task queue for a specific internal web application which is hosted inside the application execution system;
   verify, using an authorization process, permission of the external web application to the specific task queue by checking information within a queue configuration file of the specific internal web application to determine whether the external web application has a sufficient privilege level to access and write to the specific internal web application's specific task queue;
   responsive to the verification, append, using a method in an external REST Task Queue API, the task to the specific task queue; and
   assign the task to a worker process in the specific internal web application such that the worker process:
   leases, using the method in the external REST Task Queue API, the task from the specific task queue;

determines whether to process the task at a current time based on whether the internal web application is busy;

modifies the task lease to zero seconds, if it is determined not to process the task at the current time, and releases, using the method in the external REST Task Queue API, the task to another worker process for processing;

processes the task by the worker process if it is determined that the specific internal web application is not busy; and responsive to completing the task, removes, using the method in the external REST Task Queue API, the task from the specific task queue.

2. The system of claim 1, wherein receiving a task from the external web application further comprises an intermediary process for managing subscriptions to the external web application's events, responsive to an external web application event, the intermediary subscription process:

identifies the specific internal web application as having subscribed to the event; and notifies the specific task queue that the specific internal web application has subscribed to the external web application's event.

3. The system of claim 1, wherein verifying the task to be appended to the specific task queue further comprises an intermediate process for managing an access control list and checking permissions, the intermediate authorization process:

verifies that the external web application is authorized to access the specific internal web application's specific task queue using the access control list;

determines the privileges of the external web application to the specific internal web application's specific task queue; and responsive to an indication that the external web application is permitted to access the specific internal web application's specific task queue and has appropriate privileges, adds a task to the specific task queue.

4. The system of claim 1, wherein the external REST Task Queue API includes methods for retrieving a task queue, retrieving a list of tasks, retrieving a specific task, inserting a task into a task queue, deleting a task from a task queue, updating a task in a task queue, and leasing a task from a task queue.

5. A computer-implemented method for enabling application tasking in an application execution system from an external web application which is external to the application execution system, the method comprising:

receiving a task from the external web application destined for a specific task queue of a specific internal web application which is hosted inside the application execution system;

verifying, using an authorization process, that the external web application has permission to access the specific task queue by checking information within a queue configuration file of the specific internal web application to determine whether the external web application has a sufficient privilege level to access and write to the specific internal web application's specific task queue;

responsive to the verification, appending, using a method in an external REST Task Queue API, the received task to the specific task queue; and assigning the appended, received task to a worker process in the specific internal web application so that the worker process leases, using the method in the in the external REST Task Queue API, the appended, received task from the specific task queue;

determines whether to process the task at a current time based on whether the specific internal web application is busy;

modifies the task lease to zero seconds if it is determined not to process the task at the current time, and releases, using the method in the external REST Task Queue API, the task to another worker process for processing;

processes the appended, received task by the worker process if it is determined that the specific internal web application is not busy; and responsive to completing the appended, received task, removes, using the method in the external REST Task Queue API, the task from the specific task queue.

6. The computer-implemented method of claim 5, wherein receiving the task from the external web application further comprises an intermediary process for managing subscriptions to the external web application's events, responsive to an external web application event, the intermediary subscription process:

identifies the specific internal web application as having subscribed to the event; and notifies the specific task queue that the specific internal web application has subscribed to the external web application's event.

7. The computer-implemented method of claim 5, wherein verifying the received task to be appended to the specific task queue further comprises an intermediate process for managing an access control list and checking permissions.

8. The computer-implemented method of claim 7, wherein the intermediate process for managing an access control list and checking permissions:

verifies that the external web application is authorized to access the specific internal web application's specific task queue using the access control list, determines the privileges of the external web application to the specific internal web application's specific task queue; and responsive to an indication that the external web application is permitted to access the specific internal web application's specific task queue and has appropriate privileges, adds a task to the specific task queue.

9. The computer-implemented method of claim 5, wherein the external REST Task Queue API includes methods for retrieving a task queue, retrieving a list of tasks, retrieving a specific task, inserting a task into a task queue, deleting a task from a task queue, updating a task in a task queue, and leasing a task from a task queue.

10. A non-transitory computer-readable medium having stored therein computer executable code that causes one or more processors to execute the steps of:

receiving a task from an external web application which is external to the application execution system destined for a specific internal task queue for a specific internal web application which is hosted inside the application execution system;

verifying, using an authorization process, permission of the external web application to the specific task queue by checking information within a queue configuration file of the internal specific internal web application to determine whether the external web application has a sufficient privilege level to access and write to the specific internal web application's specific task queue;

responsive to the verification, appending, using a method in an external REST Task Queue API, the received task to the specific task queue; and assigning the task to a worker process in the specific internal web application such that the worker process:
- leases, using the method in the external REST Task Queue API, the task from the specific task queue;
- determines whether to process the task at a current time based on whether the internal web application is busy;
- modifies the task lease to zero seconds if it is determined not to process the task at the current time, and releases, using the method in the external REST Task Queue API, the task to another worker process for processing;
- processes the task by the worker process if it is determined that the specific internal web application is not busy; and
- responsive to completing the task, removes, using the method in the external REST Task Queue API, the task from the specific task queue.

11. The non-transitory computer-readable medium of claim 10, wherein receiving a task from an external web application further comprises an intermediary process for managing subscriptions to the external web application's events, responsive to an external web application event, the intermediary subscription process:
- identifies the specific internal web application as having that subscribed to the event; and
- notifies the specific task queue that the specific internal web application has subscribed to the external web application's event.

12. The non-transitory computer-readable medium of claim 10, wherein verifying the received task to be appended to the specific task queue further comprises an intermediate process for managing an access control list and checking permissions.

13. The non-transitory computer-readable medium of claim 12, wherein the intermediate process for managing an access control list and checking permissions:
- verifies that the external web application is authorized to access the specific internal web application's specific task queue using the access control list; and
- determines the privileges of the external web application to the specific internal web application's specific task queue, and responsive to an indication that the external web application is permitted to access the specific internal web application's specific task queue and has appropriate privileges, adds a task to the specific task queue.

14. The non-transitory computer readable medium of claim 10, wherein the external REST Task Queue API includes methods for retrieving a task queue, retrieving a list of tasks; retrieving a specific task, inserting a task into a task queue, deleting a task from a task queue, updating a task in a task queue, and leasing a task from a task queue.

* * * * *